Patented Oct. 27, 1925.

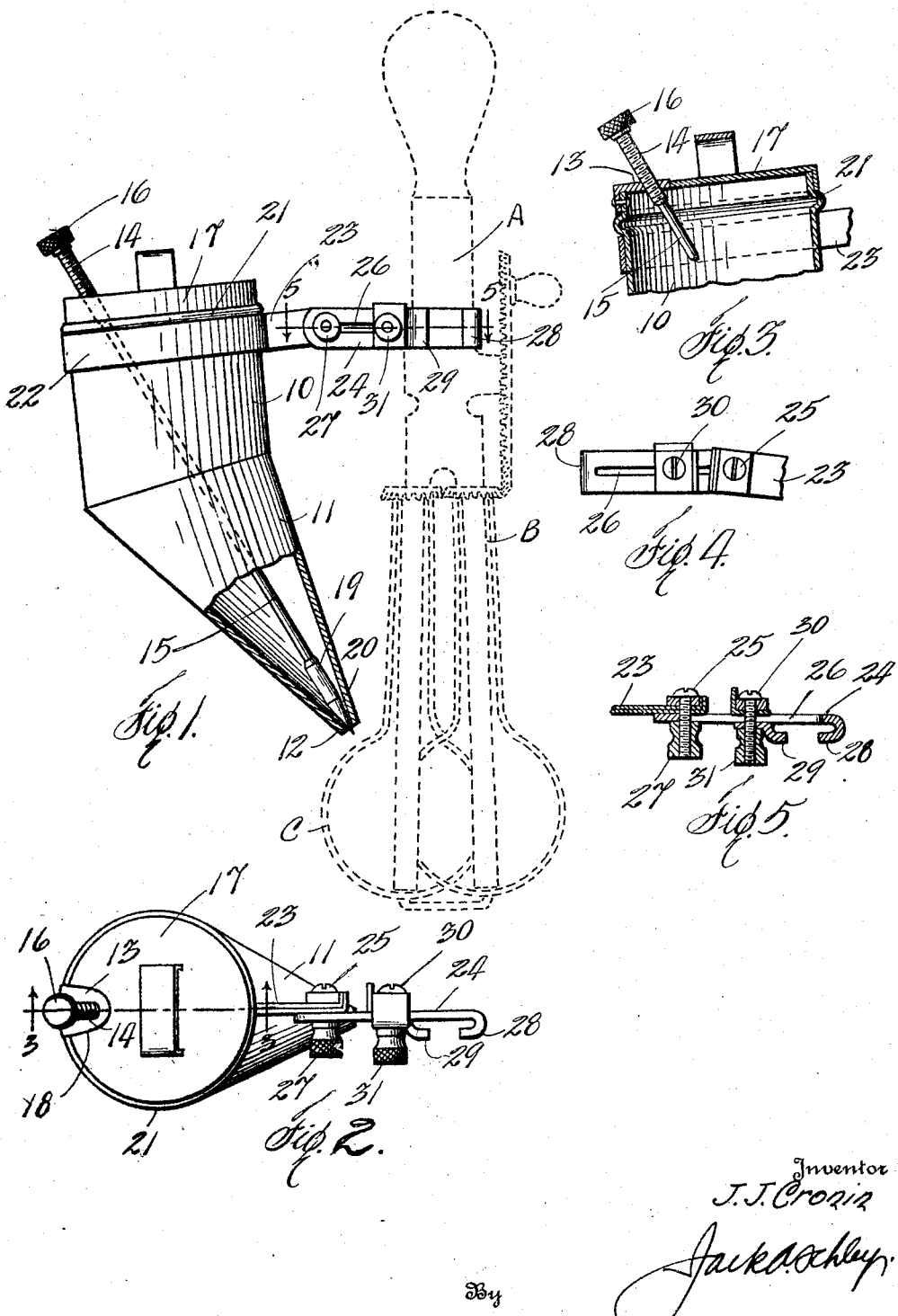

1,558,844

UNITED STATES PATENT OFFICE.

JOHN J. CRONIN, OF DALLAS, TEXAS.

OIL DROPPER.

Application filed January 15, 1925. Serial No. 2,643.

*To all whom it may concern:*

Be it known that I, JOHN J. CRONIN, a citizen of the United States of America, residing at Dallas, in the county of Dallas and State of Texas, have invented certain new and useful Improvements in Oil Droppers, of which the following is a specification.

This invention relates to new and useful improvements in oil droppers.

In the mixing of certain salads and dressings it is customary to use olive oil, cotton seed oil and the like, and where eggs or other food ingredients enter into the mixture, it is highly desirable to add the oil in small quantities, while the mixture is being agitated or whipped. Where eggs are used a large quantity of oil tends to cook the egg and thus spoil the dressing.

The object of the invention is to provide a receptacle for containing a measure of oil and adapted to be attached to an ordinary egg beater or the like and equipped with means for discharging the oil in small quantities or drops directly into the mixture being agitated by the beaters.

A further object is to provide in an oil dropping receptacle, a discharge spout and a valve operable from the outside of the receptacle for controlling the discharge of oil from the spout.

A construction designed to carry out the invention will be hereinafter described together with other features of the invention.

The invention will be more readily understood from a reading of the following specification and by reference to the accompanying drawings, in which an example of the invention is shown, and wherein:

Fig. 1 is a view showing an oil dropper in full lines constructed in accordance with my invention and attached to an egg beater illustrated in dotted lines.

Fig. 2 is a plan view of the dropper,

Fig. 3 is a vertical sectional view of the upper portion of the dropper,

Fig. 4 is a side view of the adjustable bracket, and Fig. 5 is a cross-sectional view of the same.

In the drawings the numeral 10 designates an oil receptacle which is preferably cylindrical and has an elongated conical hopper 11 extending from its bottom. The hopper extends at a slight angle to the vertical axis of the receptacle and terminates in a spout 12.

At its upper edge the receptacle has an inwardly directed overhanging bracket 13, suitably fastened thereto. The bracket is screw threaded to receive the screwed shank 14 of a valve stem 15, surmounted by a milled head 16. A cap 17 fitting on top of the receptacle is notched out at 18 to receive the bracket. The stem 15 has a cylindrical valve 19 at its lower end provided with an elongated tapered point 20. The point is shaped to enter and protrude from the spout and to close the latter when the stem is screwed down.

Near the upper end of the receptacle is an annular bead 21 which rests upon the ring 22 of a clamp supporting the receptacle. The ring has a radially extending arm 23. The arm is adjustably mounted on a bracket 24 by means of a clamp screw 25 passing through a slot 26 extending longitudinally of the bracket. The screw carries a thumb nut 27, whereby the arm may be fastened in adjusted positions.

The bracket has a hook 28 at its opposite end for engaging around the shank A of an ordinary egg beater B. A keeper 29 clamps the bracket on the shank A and is held by a screw 30 passing through the slot 26 and a thumb nut 31 mounted on the screw. It is to be understood that the form of bracket or clamp may be changed to conform to the style of beater to which the dropper is attached.

In using the dropper the arm 23 is adjusted to swing the spout 12 relatively over one of the beaters C of the device B. The bracket may be adjusted to hold the dropper at the proper elevation. By disposing the hopper at an angle to the receptacle, room is given for the bracket adjustments and the receptacle is held nearly upright while the spout is directed over the beater C.

The cover 17 is removed and the receptacle 10 is filled with the oil to be used. The receptacle and hopper may have a capacity equal to a cup (measure) or this may vary.

The stem 15 may be adjusted to position the valve point 20 in the spout 12 to cause the oil to drop from the spout at predetermined intervals. By turning the head 16 the point is adjusted to increase or decrease the quantity of oil dropped. Owing to the taper of the valve point and the spout the frequency of the drops may be varied without materially altering the quantity of the drops.

Various changes in the size and shape of the different parts, as well as modifications and alterations may be made within the scope of the appended claims.

What I claim, is:

1. In a device of the class described, a support having beaters thereon and including a frame, a clip for connection to said frame and having an extended arm, a clamp mounted upon said arm for sliding and rotative adjustment, and a receptacle carried by said clamp and discharging upon said beater and adjustable relative thereto.

2. In an oil dropper, a receptacle having a conical hopper terminating in a spout, a valve cooperating with said spout, a support, a clip mounted thereon and having a slotted arm, and a clamp supporting said receptacle and having a pivotal connection adjustable in the slot of said arm.

In testimony whereof I affix my signature.

JOHN J. CRONIN.